(12) United States Patent
Dean

(10) Patent No.: US 7,685,014 B2
(45) Date of Patent: Mar. 23, 2010

(54) BANK QUEUE MONITORING SYSTEMS AND METHODS

(75) Inventor: Cliff Edwards Dean, 9141 Crockett, Argyle, TX (US) 76226

(73) Assignee: Cliff Edwards Dean, Argyle, TX (US)

(*) Notice: Subject to any disclaimer, the term of this patent is extended or adjusted under 35 U.S.C. 154(b) by 75 days.

(21) Appl. No.: 11/713,391

(22) Filed: Mar. 2, 2007

(65) Prior Publication Data

US 2008/0046304 A1 Feb. 21, 2008

Related U.S. Application Data

(60) Provisional application No. 60/833,924, filed on Jul. 28, 2006.

(51) Int. Cl.
*G05B 19/418* (2006.01)
*G06F 9/46* (2006.01)

(52) U.S. Cl. .............. 705/8; 700/90; 382/101; 340/5.2; 348/155; 705/7; 705/9

(58) Field of Classification Search .............. 705/8
See application file for complete search history.

(56) References Cited

U.S. PATENT DOCUMENTS 5,912,979 A * 6/1999 Gavrilos .............. 382/101

| | | | |
|---|---|---|---|
| 6,529,786 B1* | 3/2003 | Sim | 700/90 |
| 7,373,309 B2* | 5/2008 | Nishikawa et al. | 705/7 |
| 2003/0102956 A1* | 6/2003 | McManus et al. | 340/5.2 |
| 2005/0073585 A1* | 4/2005 | Ettinger et al. | 348/155 |
| 2008/0059274 A1* | 3/2008 | Holliday | 705/8 |

OTHER PUBLICATIONS

The P.R.I.S.M. Project: Measuring In-Store Reach. In-Store Marketing Institute, In-Store Metrics Consortium. http://www.instoremarketer.org/?q=node/5779. Sep. 2006.*

* cited by examiner

*Primary Examiner*—Bradley B Bayat
*Assistant Examiner*—Jaime Cardenas-Navia
(74) *Attorney, Agent, or Firm*—Thompson & Knight LLP; James J. Murphy

(57) ABSTRACT

A system for monitoring a queue including an entry sensor subsystem for sensing the entrance of customers into the queue, an exit sensor subsystem for sensing the exit of customers from the queue, and a processing system in communication with the entry and exit sensor subsystems. The processing system is operable to log a customer sensed by the entry sensor as entering the queue, determine from the exit sensor subsystem if the logged customer has exited the queue within a predetermined time period, and if the logged customer has exited the queue within the predetermined time period, log the customer as having received service or, if the logged customer has not exited the queue within the predetermined time period, provide an indication to management personnel.

16 Claims, 5 Drawing Sheets

QueueTime

Q Charts

Queue Stats
○ People in Queue
  ○ vs. Time of Day
  ○ vs. Date
○ Time in Queue
  ○ vs. Time of Day
  ○ vs. Date
○ Q_COUNT vs Q_TIME

Select Date
From: 05/09/2006 ▶
To: 05/09/2006 ▶

Select Time
From: 09:00 ▶
To: 18:00 ▶

Select Days
☐ M  ☐ T  ☐ W  ☐ Th
☐ F  ☐ Sat  ● All

Analytics
☑ Show Average  Settings
☐ Show Trendline  Settings

Daily Queue Report (DQR)
Branch: #0009   Date: 08/10/2006

Current Day Summary

| | Green (0 - 4 Minutes) | | Yellow (5 - 6 Minutes) | | Red (7+ Minutes) | | Hourly Sum | Hourly AWT |
|---|---|---|---|---|---|---|---|---|
| | Count | AWT(mins) | Count | AWT(mins) | Count | AWT(mins) | | |
| 8am - 9am | 11 | 0.1 | - | - | - | - | 11 | 0.1 mins |
| 9am - 10am | 27 | 0.2 | - | - | - | - | 27 | 0.2 mins |
| 10am - 11am | 16 | 0.1 | - | - | - | - | 16 | 0.1 mins |
| 11am - 12pm | 30 | 1.7 | 2 | 4.6 | - | - | 32 | 1.9 mins |
| 12pm - 1pm | 42 | 0.3 | - | - | - | - | 42 | 0.3 mins |
| 1pm - 2pm | 79 | 1.3 | 1 | 4.1 | - | - | 80 | 1.3 mins |
| 2pm - 3pm | 73 | 0.7 | - | - | - | - | 73 | 0.7 mins |
| 3pm - 4pm | 41 | 1.4 | 2 | 4.4 | - | - | 43 | 1.6 mins |
| 4pm - 5pm | 2 | 0.7 | - | - | - | - | 2 | 0.7 mins |
| 5pm - 6pm | - | - | - | - | - | - | - | - |
| 6pm - 7pm | - | - | - | - | - | - | - | - |
| 7pm - 8pm | - | - | - | - | - | - | - | - |
| 8pm - 9pm | - | - | - | - | - | - | - | - |
| Daily Totals | 321 (98.5%) | 0.9 | 5 (1.5%) | 4.4 | - (0.0%) | - | 326 | 0.9 mins |

Current Week Summary

| | Monday | Tuesday | Wednesday | Thursday | Friday | Saturday | Sunday | Weekly Totals | Month To Date |
|---|---|---|---|---|---|---|---|---|---|
| Green | | | | | | | | | |
| Count | 220 | 345 | 332 | 321 | - | - | - | 1218 (95.8%) | 2261 (96.9%) |
| AWT(mins) | 0.9 | 0.6 | 0.8 | 0.9 | - | - | - | 0.8 mins | 0.7 mins |
| (MIN/MAX) | (0.0/4.0) | (0.0/3.6) | (0.0/3.8) | (0.0/3.8) | (0.0/0.0) | (0.0/0.0) | (0.0/0.0) | (0.0/0.4) | (0.0/4.0) |
| Yellow | | | | | | | | | |
| Count | 21 | 1 | 8 | 5 | - | - | - | 35 (2.8%) | 53 (2.3%) |
| AWT(mins) | 5.5 | 4.2 | 4.6 | 4.4 | - | - | - | 5.1 mins | 4.9 mins |
| (MIN/MAX) | (4.1/6.9) | (4.2/4.2) | (4.1/6.1) | (4.1/4.7) | (0.0/0.0) | (0.0/0.0) | (0.0/0.0) | (4.1/6.9) | (4.1/6.9) |
| Red | | | | | | | | | |
| Count | 16 | 2 | 2 | - | - | - | - | 18 (1.4%) | 20 (0.9%) |
| AWT(mins) | 7.9 | 8.1 | 8.1 | - | - | - | - | 7.9 mins | 7.9 mins |
| (MIN/MAX) | (7.1/8.6) | (0.0/0.0) | (7.5/8.7) | (0.0/0.0) | (0.0/0.0) | (0.0/0.0) | (0.0/0.0) | (7.1/1.0) | (7.1/0.9) |
| Daily Totals | | | | | | | | | |
| Count | 257 | 346 | 342 | 326 | - | - | - | 1271 | 2334 |
| AWT(mins) | 1.7 | 0.6 | 0.9 | 0.9 | - | - | - | - | - |
| (MIN/MAX) | (0.0/8.6) | (0.0/4.2) | (0.0/8.7) | (0.0/4.7) | (0.0/0.0) | (0.0/0.0) | (0.0/0.0) | (0.0/1.0) | (0.0/0.9) |

FIG. 4

BANK QUEUE MONITORING SYSTEMS AND METHODS

CROSS-REFERENCE TO RELATED APPLICATION

The present application claims priority to Provisional Application Ser. No. 60/833,924, filed Jul. 28, 2006.

FIELD OF INVENTION

The present invention relates in general to customer service monitoring techniques, and in particular, to bank queue monitory systems and methods.

BACKGROUND OF INVENTION

Whether it is a supermarket or a bank lobby, the vast majority of customers do not enjoy standing in line. Customers particularly become frustrated when wait lines become unacceptably long due to insufficient number of customer service personnel, for example tellers at a bank.

At the same time, every well run business is cognizant of minimizing customer frustration. Nevertheless, most businesses do not have a limited number of personnel which are available to service customer needs during peak periods of the day. Furthermore, these business owners must also contend with low periods, during which the customer flow is minimal and hence those personnel on stuff must be assigned to other tasks.

Thus, businesses, such as banks, which have a limited number of personnel available to service customer needs, need efficient ways of monitoring their customer queues such that customer frustration within a queue wait times can be minimized, while efficient use of available service personnel can be maximized.

SUMMARY OF INVENTION

The principles of the present invention are embodied in queue monitoring systems and methods. According to one representative embodiment, a system is disclosed for monitoring a queue that includes an entry sensor subsystem for sensing the entrance of customers into the queue, an exit sensor subsystem for sensing the exit of customers from the queue, and a processing system in communication with the entry and exit sensor subsystems. The processing system is operable to log a customer sensed by the entry sensor as entering the queue, determine from the exit sensor subsystem if the logged customer has exited the queue within a predetermined time period, and if the logged customer has exited the queue within the predetermined time period, log the customer as having received service or, if the logged customer has not exited the queue within the predetermined time period, provide an indication to management personnel.

The embodiments of the principles of the present invention realize substantial advantages over existing queue management systems. Among other things, by monitoring and reporting queue activities, bank managers can optimize staffing resources as needed to service local queues at a bank branch. On a wider basis, bank managers can use the information gathered by multiple queuing systems to develop responses to underperforming branches. In turn, the improved ability to deliver timely and consistent customer service improves customer satisfaction and customer loyalty.

BRIEF DESCRIPTION OF DRAWINGS

For a more complete understanding of the present invention, and the advantages thereof, reference is now made to the following descriptions taken in conjunction with the accompanying drawings, in which:

FIG. 4 is a diagram of a representative computer generated daily queue report providing summary queue activity information for the current day, week and month.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
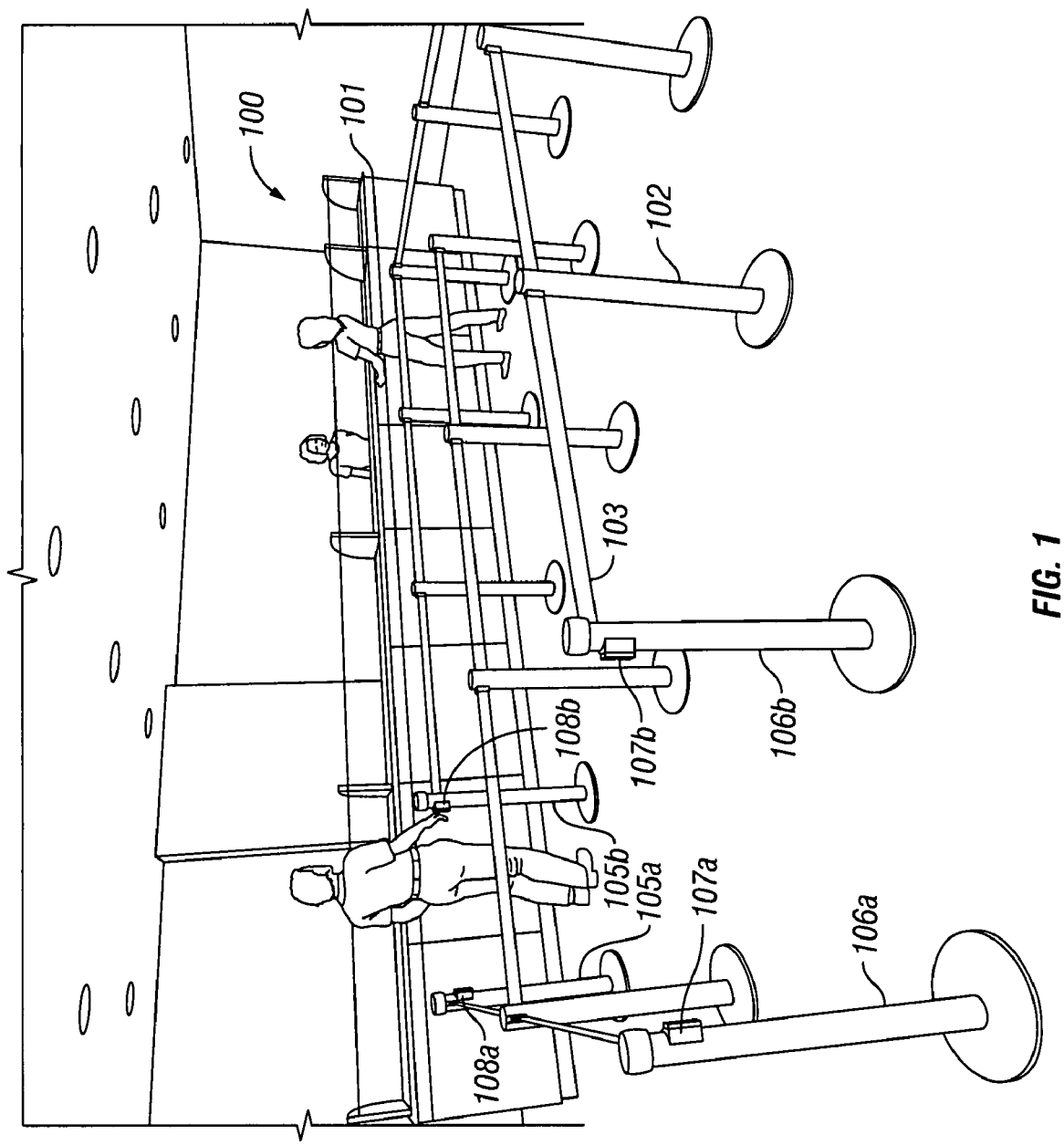
FIG. 1 is a perspective diagram of a bank lobby utilizing an exemplary queue monitoring system embodying the principles of the present invention.
Figure 2:
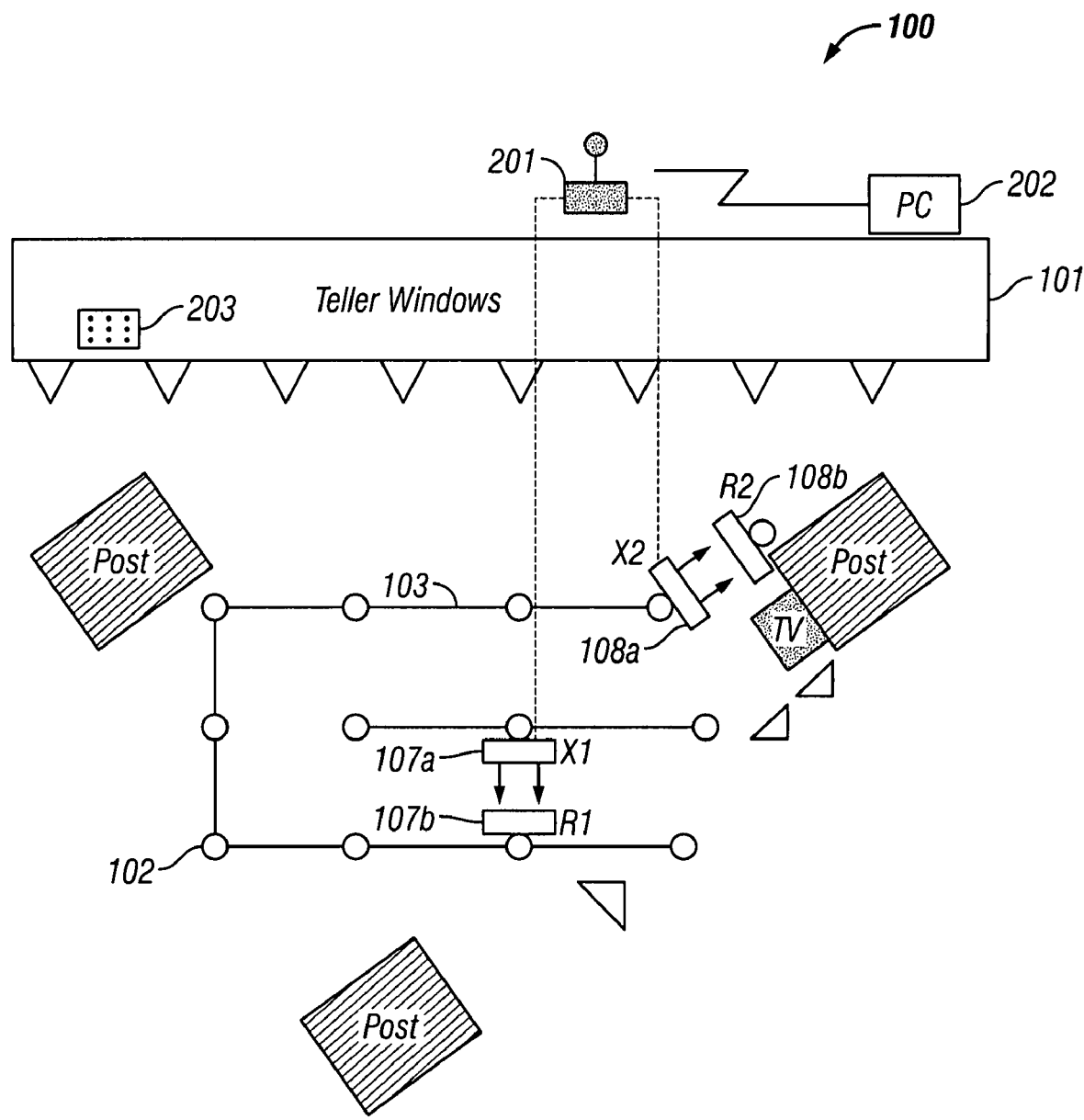
FIG. 2 is a plan view diagram of the bank lobby of FIG. 1.

FIG. 1 is a prospective view of a portion of a bank lobby suitable for illustrating a typical application of the principles of the present invention. FIG. 2 is a plan view conceptually illustrating the major features of bank lobby 100. It should be noted that while the present inventive principles are being demonstrated herein in conjunction with a bank lobby, these principles can be applied to numerous commercial situations which require customer queuing.

Shown in FIGS. 1 and 2, bank lobby 100 includes a traditional panel of teller windows 101. Customer queues are controlled by a conventional queuing system including a number of stanchions 102 as supporting a ribbon 103 which effectively define a set of barriers for managing customer progression through the queue. One set of stanchions 105A-105B define a queue exit from which customers can walk to the next available teller on teller panel 101. Similarly, set of stanchions 106a-106b define a queue entrance allowing customers to enter the queue.

According to the principles of the present invention, an entrance transmitting infrared device (X1) 107a and an entrance receiving infrared device (R1) 107b generate a pair of entrance detection beams (i.e. beams A and B) between entrance stanchions 106a-106b. Similarly, an exit infrared transmitter (X2) 108a and an exit infrared receiver 108b generate a pair of exit detection beams (i.e. beans A and B) between exit stanchions 108a and 108b. In the illustrated embodiment, infrared beam entrance sensors 107a-107b and exit sensors 108a-108b wirelessly communicate with queue management system 201 of FIG. 2. Generally, queue manager 201 stores information collected by entrance sensors 107a-107b and exit sensors 108a-108b and provides statistical information to allow bank management personnel to appropriately staff bank teller panel 101 for a given time or day.

The principles of the present invention are generally practiced as follows, although a more detailed example will be provided below in conjunction with FIG. 5. When a customer enters a queue, the infrared beams between entrance sensors 107a-107b are broken and queue manager 201 logs an entrance event to the queue. Similarly, when a customer exits the queue, the beams between exit sensors 108a and 108b are broken and queue manager 201 logs an exit event from the queue.

In the preferred embodiment, entrance sensors 107a-107b and exit sensors 108a-108b are bidirectional, with beam A normally broken before beam B, to ensure that the entrance and exit events are logged correctly, even if customer backs-out through entrance sensors 107a-107b or backs-in through exit sensors 108a-108b. For example, if a customers backs-out through the entrance beams between entrance sensors 107a and 107b, queue manager 201 recognizes that entrance beam B has been broken before entrance beam A, and therefore the last customer logged-in is removed from the list of queued customers. Similarly, if a customer backs-in through the exit beams between exit sensors 108a and 108b, queue manager 201 recognizes that the exit beam B has been broken before exit beam A. In this case, queue manager 201 correspondingly returns the last removed logged customer back onto the list of queued customers.

Figure 3:
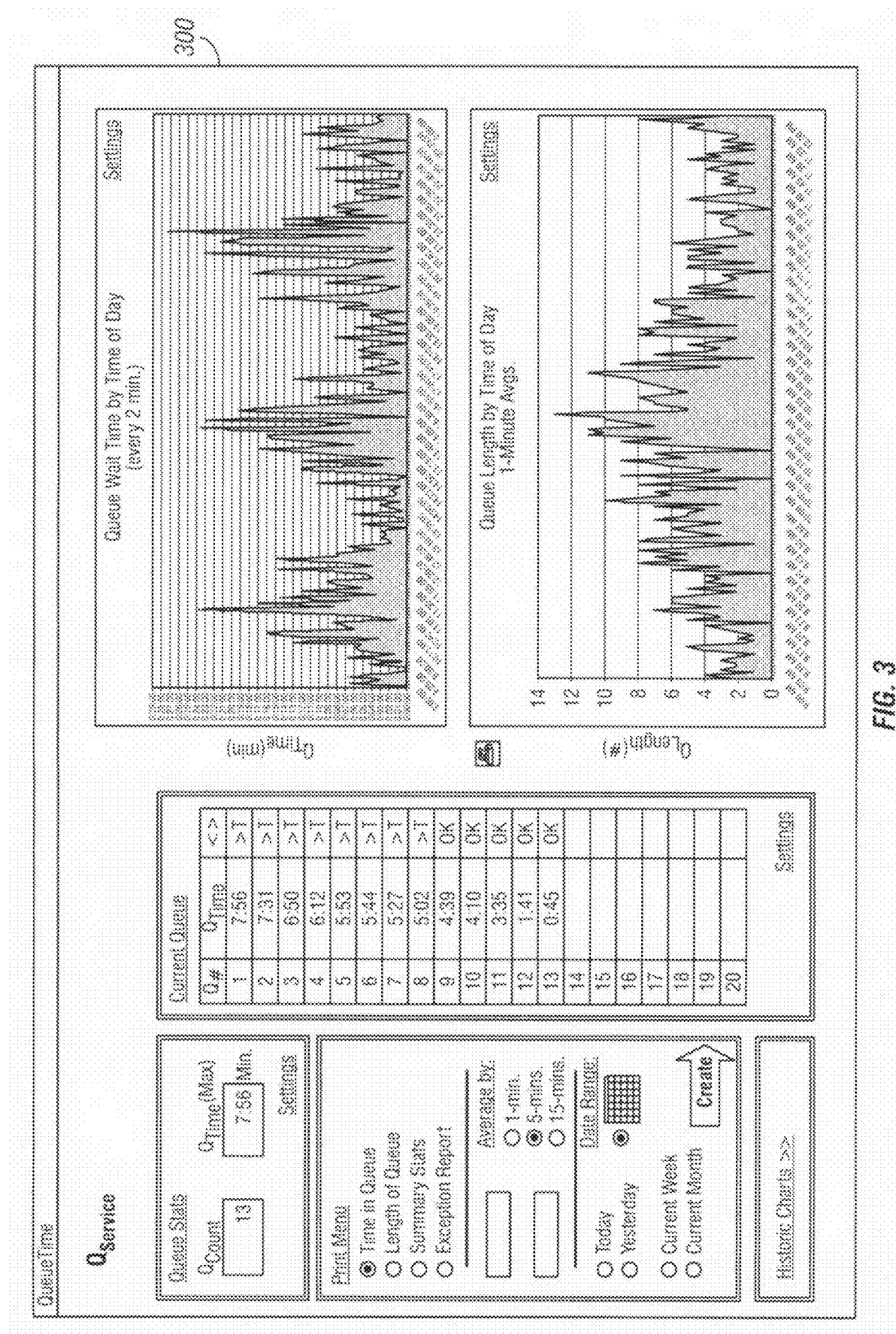
FIG. 3 is a diagram of a representative computer display providing statistical information on current queue length and current queue wait times, along with average wait times and queue lengths over selected time periods.

Queue manager 201 includes a personal computer (PC) 202, which displays a ladder, such as that labeled CURRENT QUEUE in display 300 of FIG. 3, which includes blocks or entries indicating the status of each current customer logged into the queue. PC 202 may be a stand alone computer, part of a network of computers, or an enterprise server that uploads information generated by the queue managers 201 at multiple bank lobbies 100.

As each customer enters the queue through the entrance beams, that customer is logged and assigned a queue position $Q_\#$ number and an associate timer $Q_{time}$ begins to run. As each customer moves up the queue, their queue position $Q_\#$ decreases as other customers exit through the exit beams.

In the illustrated embodiment, each teller window includes a keypad 203, which allows a teller to enter information concerning a customer arriving from the queue. Such information may include, for example, the time the teller became available to serve the customer, the amount of time required to serve the customer, and the type or types of transaction completed. This information is also transmitted to queue manager 201 and PC 202 for statistical evaluation. Additional keypads 203 may be provided at loan and other desks within bank lobby 100, to allow for the tracking and statistical evaluation of other types of transactions being handled, such as loans, certificates of deposits (CDs), special promotions, and the like. Moreover, keypads 203 will allow for the performance tracking of tellers and loan officers of different levels of training. Finally, additional keypads 203 may be distributed around the bank lobby for use by customers for the entry and tracking data related to non-transactional customer services provided by the bank.

Initially, each customer's display block is green, indicating to management personnel that the customer's queue wait time is still acceptable. If the timer $Q_{time}$ for a given customer reaches a certain value (e.g. 3 minutes), indicating that the customer's queue wait time is becoming marginally unacceptable, then the corresponding entry in the ladder turns from green to yellow and an audible sound is generated to alert bank management. Further, if that customer continues to remain in the queue, and the timer $Q_{time}$ reaches given value (e.g. 5 minutes) then the corresponding block on the ladder turns from yellow to red and a tone is again provided to alert management, such that an additional teller can be added to teller panel 101, additional services offered to the customer, or both.

The principles of the present invention also address the problem of "ghosts" in the queue. Ghosts in the queue occur when a customer within the queue ducks under or steps over barrier ribbon 103 to either proceed to a teller or simply exit the queue for some other reason. Moreover, a customer leaving a teller may step through the exit beams and then step over or duck under barrier ribbon 103. In either case, the customer does not break both the entrance beams and the exit beams, and there will be an additional log entry which remains on the ladder for an extended period of time. According to the principles of the present invention, queue manager 201 runs a software filter which tracks the current average normal customer flow time through the queue. If a customer entry status turns from green to yellow, and the time $Q_{time}$ for that entry exceeds the average flow timed by a pre-selected amount, then that entry is deemed represent either a person who has entered the queue through either the entrance or exit beans, but has ducked under or stepped over ribbon 103. The log entry is discarded and removed from the ladder.

In addition to the queue ladder, the representative display generated by queue manager 201 includes statistical information that allows a bank manager to anticipate peak activity periods and efficiently allocate customer service personnel. It also allows management to evaluate performance of the given bank branch for comparison against the performance of other bank branches and/or performance goals.

In the embodiment of FIG. 3, display 300 includes queue wait versus time graph, which allows bank management to identify peak times of day during which assignment of additional personnel to bank teller panel 101 may be advantageous. In addition to providing statistical information concerning queue wait time, display 300 also provides a graph representing the queue length versus time of day. Additionally, display 300 provides current queue statistics, including the number of customers currently in the queue ($Q_{count}$) and the maximum time ($Q_{time}$) corresponding to the longest waiting customer in the current queue.

FIG. 4 illustrates a representative integrated report 400 available through the queue manager 201 personnel computer 202. In this embodiment, report 400 provides summary information for the current date, current week, and current month. Report 400 allows a manager to observe, for a given period of time, the number of customer receiving service within an acceptable waiting time (i.e. the "green count"), the number of customers receiving service within a marginally long waiting time (i.e. the "yellow count") and the number of customers having to stand in the queue for an unacceptably long waiting time (i.e. the "red count"). Display 400 also allows a manager to analyze average wait time and the average number of green, yellow, and red counts on daily, weekly, and monthly bases.

The format and content of displays and reports 300 and 400 of FIGS. 3 and 4 are exemplary; there are numerous ways to provide customized delivery of current and historical data to a branch manager concerning queue activities such that prompt action can be appropriately taken and overall service levels maintained.

Figure 5:
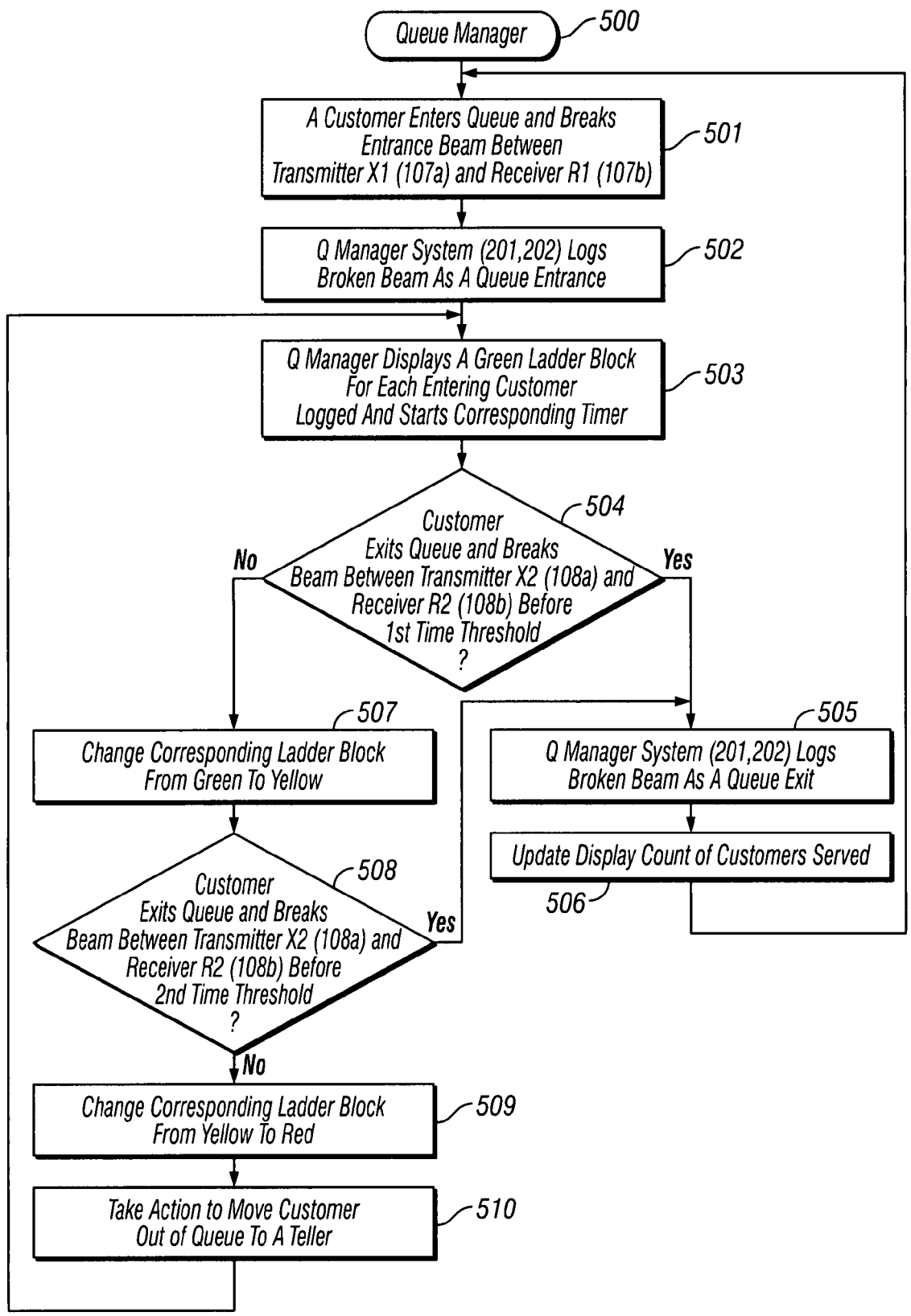
FIG. 5 is a flow chart illustrating a representative queue monitoring procedure embodying the principles of the present invention.

FIG. 5 is a flow chart of an exemplary queue management procedure 500 embodying the principles of the present invention. At Block 501, a customer enters the queue and breaks the entrance beam between transmitter X1 and receiver R1, which is logged as a queue entrance event by queue manager 201 at Block 501. At Block 503, queue manager 201 displays a green ladder block for each entering customer logged and starts a corresponding timer.

At decision Block 504, a decision is made as to whether the customer exits the queue and breaks the beam between exit transmitter X2 and exit receiver R2 before a first predetermined time threshold has been reached. If the condition at decision Block 504 is true, then the customer has been serviced within an acceptable waiting time, and therefore at Block 505, queue manager 201 logs the broken beam as a successful queue exit. The display count (e.g. the current queue display on display 300 of FIG. 3 is updated at Block 506, and procedure 500 returns to Block 501 to process the next customer entering the queue.

On the other hand, if the first time threshold has been exceeded at Block 504, then at Block 507 the ladder block corresponding to that customer changes from green to yellow. A determination is then made at decision Block 508 as to whether the customer exits the queue and breaks the exit beam between transmitter X2 and receiver R2 before a second time threshold has been reached. If the customer successfully exits the queue before the second time threshold has been met, then Procedure 500 returns to Block 505 and the customer is logged as a successful queue exit. Otherwise, the corresponding ladder block for that customer changes from red to yellow at Block 509, such that a bank manager or other bank personnel can take appropriate action to move that customer out of the queue to a teller.

The embodiments of the principles of the present invention realize substantial advantages over existing queue management systems. Among other things, by monitoring and reporting queue activities, bank managers can optimize staffing resources as needed to service local queues at a bank branch. On a wider basis, bank managers can use the information gathered by multiple queuing systems to develop responses to underperforming branches. In turn, the improved ability to deliver timely and consistent customer service improves customer satisfaction and customer loyalty.

It should be noted that while the principles of the present invention have been illustrated using an exemplary teller queue; these principles are applicable in other areas of bank lobby 100. For example, sensors similar to sensors 107a-107b or sensors 108a-108b may be disposed at the entrance to the bank lobby 100 for tracking the number of people entering and exiting the bank branch. This information advantageously provides a baseline for determining where customers go inside bank lobby 100 and what services they receive. This baseline also allows bank managers to determine the number of people who come into bank lobby 100, but leave without receiving any services.

Additionally, sensors similar to sensors 107a-107b or sensors 108a-108b may be used to monitor the number of customers entering or exiting such areas of the bank as the safety deposit box vault or the depository machines, to name only a few examples.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A system for monitoring customers standing in a queue comprising:
   an entry sensor subsystem configured to sense entrance of customers into the queue;
   an exit sensor subsystem configured to sense exit of customers from the queue; and
   a processing system in communication with the entry and exit sensor subsystems configured to:
   log a customer sensed by the entry sensor subsystem as entering the queue;
   determine from the exit sensor subsystem if the logged customer has exited the queue within a predetermined time period;
   if the logged customer has exited the queue within the predetermined time period, log the customer as having received service;
   if the logged customer has not exited the queue within the predetermined time period, provide an indication to management personnel;
   track a current average customer flow time through the queue and determine whether a wait time for the logged-in customer exceeds the current average customer flow time by a selected amount; and
   log-out the logged customer in response to a determination that the wait time for the logged customer exceeds that current average customer flow time by the selected amount.

2. The system of claim 1, further configured, if the logged customer has not exited the queue within the predetermined time period to:
   determine from the exit sensor if the logged customer has exited the queue within a second predetermined time period;
   if the logged customer has exited the queue within the second predetermined time period, log the customer as having received service; and
   if the logged customer has not exited the queue within the second predetermined time period, provide a second indication to management personnel.

3. The system of claim 1, wherein the processing system is configured to provide a colored entry on a display ladder of a first color representing the logged customer and changes the colored entry to a second color if the logged customer has not exited the queue within the predetermined time period.

4. The system of claim 1, wherein the entry sensor subsystem and the exit sensor subsystem communicate with the processor via a wireless link.

5. The system of claim 1, wherein the entry sensor subsystem comprises a transmitter and a receiver which provide an infrared beam across an entry to the queue.

6. The system of claim 1, wherein the exit sensor subsystem comprises a transmitter and a receiver which provide an infrared beam across an exit to the queue.

7. The system of claim 1, wherein the processing system is further configured to:
   detect with the exit sensor subsystem that the logged customer has exited the queue and then returned to the queue; and
   re-log the customer as being in the queue.

8. The system of claim 1, wherein the processing system is further configured to:
   detect with the entrance sensor subsystem that the logged customer has exited the queue as sensed by the entrance sensor subsystem; and
   log-out the logged customer as having exited the queue.

9. A method of monitoring customers standing in a queue to ensure customers receive timely service comprising:
- detecting with a computer the breaking of an entrance detection beam of an entrance detector by a customer entering the queue;
- generating with the computer a display entry corresponding to the customer on a display screen, the display entry having a first color;
- determining with the computer if the customer exits the queue by breaking an exit detection beam of an exit detector prior to expiration of a time period, wherein:
  - if the customer exits the queue by breaking the exit detection beam prior to the expiration of the time period, logging the customer with the computer as having exited the queue and update the display entry;
  - if the customer does not exit the queue by breaking the exit detection beam prior to expiration of the time period, changing the display entry on the display screen with the computer to a second color;
- tracking with the computer a current average customer flow time through the queue and determining with the computer whether a wait time for the logged customer exceeds that current average customer flow time by a selected amount; and
- logging-out with the computer the logged customer in response to a determination that the wait time for the logged customer exceeds that current average customer flow time by a selected amount.

10. The method of claim 9, further comprising:
- determining with the computer if the customer exits the queue by breaking an exit detection beam prior to expiration of a second time period subsequent to the time period, wherein:
  - if the customer does not exit the queue by breaking the exit detection beam prior to expiration of the second time period, changing with the computer the display entry from the second color to a third color.

11. The method of claim 10, wherein the first color is green, the second color is yellow, and the third color is red.

12. The method of claim 9, further comprising generating with the computer an audible tone along with changing the display entry to a second color.

13. The method of claim 9, further comprising providing with the computer statistical information on the display representing average wait time and average queue length.

14. The method of claim 9, further comprising:
- detecting with the computer that the logged customer has exited the queue by breaking the exit detection beam and then returned to the queue by breaking the exit detection beam; and
- re-logging with the computer the customer with the computer as being in the queue.

15. The method of claim 9, further comprising:
- detecting with the computer that the logged customer has exited the queue by breaking the entrance detection beam; and
- logging-out with the computer the logged customer as having exited the queue.

16. A queue monitoring system comprising:
- an entrance detection subsystem generating a first infrared detection beam for monitoring an entrance point to the queue;
- an exit detection subsystem generating a infrared detection beam for monitoring; and
- a queue management system wirelessly communicating with the entrance and exit detection subsystems configured to:
- detect the breaking of the first detection beam by a customer entering the queue;
- log-in the customer entering the queue and setting a corresponding timer;
- determine if the logged-in customer breaks the second detection beam prior to the timer reaching a pre-selected time threshold, wherein:
  - if the customer breaks the second detection beam prior to the timer reaching a pre-selected time threshold, logging the customer as having exited the queue;
  - if the customer does not break the second detection beam prior to the timer reaching a pre-selected threshold, generating an indication that the customer remains in the queue;
- track a current average customer flow time through the queue and determine whether a wait time for the logged-in customer exceeds that current average customer flow time by a selected amount; and
- log-out the logged customer in response to a determination that the wait time for the logged-in customer exceeds that current average customer flow time by a selected amount.

* * * * *